INVENTOR
Frank R. Maxwell
BY
ATTORNEYS.

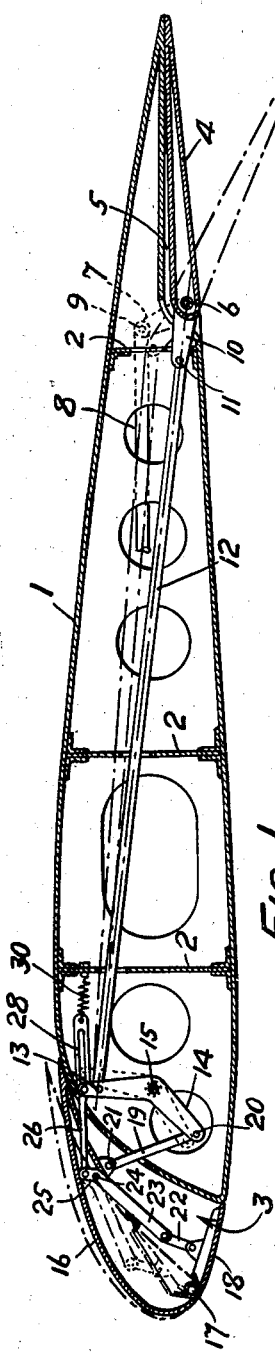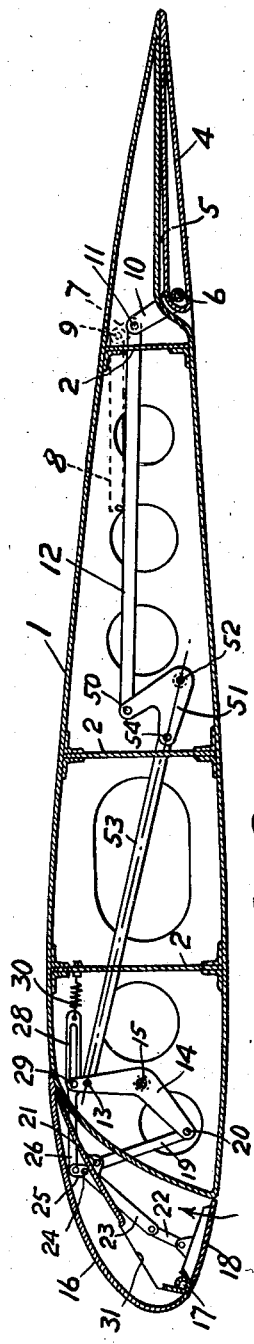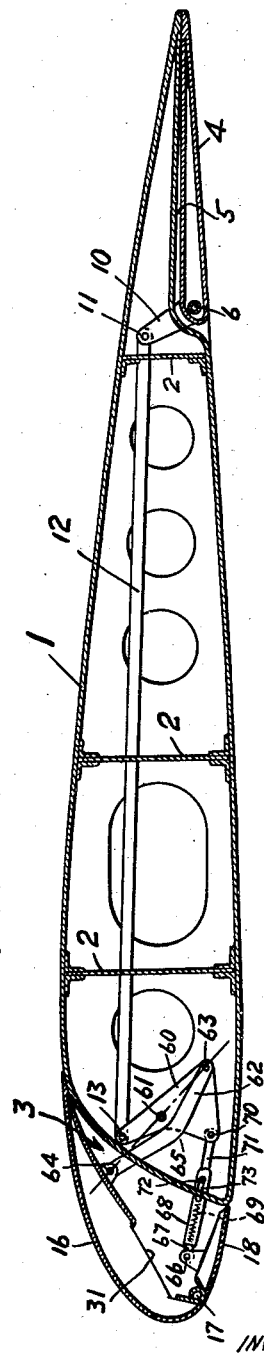

Patented Aug. 7, 1945

2,381,681

UNITED STATES PATENT OFFICE 2,381,681

AIRPLANE AND CONTROL DEVICE THEREFOR

Frank R. Maxwell, Rose Valley, Pa.

Original application November 12, 1940, Serial No. 365,347. Divided and this application March 17, 1943, Serial No. 479,435

4 Claims. (Cl. 244—42)

My present invention relates to airplanes and more particularly has reference to an airplane wing having a novel slot and flap so interconnected that the opening movement of the slot is under positive control of the pilot at all times. More specifically, the slot is locked in its closed position against aerodynamic forces acting on the nose of the wing until the pilot moves the flap.

An object of this invention is to provide a wing having an interconnected slot and flap in which the connecting linkage is so arranged that it exerts its greatest mechanical force when the greatest aerodynamic forces are acting on the slot or flap.

To achieve the foregoing and other objects, this invention comprises providing a slot adjacent to the leading edge of the wing and a flap near the trailing edge of the wing. The upper and lower openings of the slot are adapted to be closed by covers which conform to the contour of the upper and lower surfaces of the wing in their closed position. Linkage connects the flap to the upper cover and there is a connection to the lower cover which is operated by movement of the linkage. A control extends from the operating linkage to the cockpit or the fuselage of the airplane so that the pilot may actuate the slot and flap by a single control.

The linkage is of such nature that the flap may move through a small angle before the slot opens and the aerodynamic forces working on the leading edge of the wing cannot open the upper cover until the pilot has moved the flap. Furthermore, the connection to the lower cover will permit the lower cover to move into contact with the upper cover to give an airfoil section to the upper cover upon the initial movement of the upper cover and will maintain this air foil section for all further movement of the upper cover, thus permitting maximum airflow through the slot.

In the drawings:

Figure 1 is a transverse sectional view of an airplane wing equipped with my novel nose slot and flap combination showing these parts in the closed position.

Figure 2 is a transverse sectional view of an airplane wing equipped with another form of my invention.

Figure 3 is a transverse sectional view of a still further form of my novel nose slot and flap combination.

Figure 4:
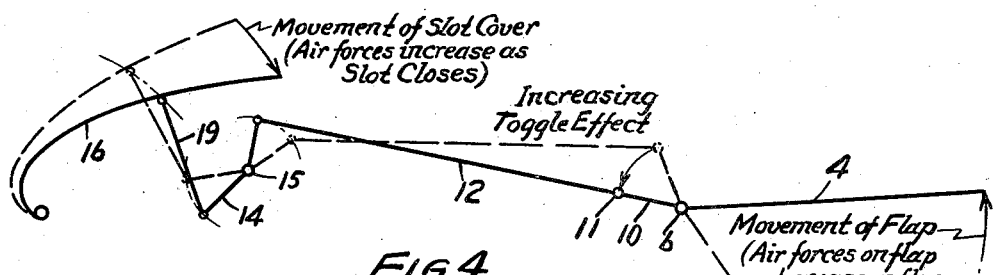
Figure 4 is a diagrammatic representation of the connecting linkage shown in Figure 1.

Referring to Figure 1, I have shown an airplane wing 1 of any suitable construction having internal spars 2, a slot 3 which extends through the wing adjacent to the leading edge thereof and a flap 4 provided near the trailing edge of the wing. The wing 1 is formed with a recess or well 5 in which the flap 4 is pivoted as shown at 6. An arm 7 is attached to the flap and an operating rod 8 is pivoted to the free end of the arm 7 as indicated at 9. The rod 8 is suitably connected to the flap operating mechanism (not illustrated) located within the cockpit or fuselage of the airplane.

There is also attached to the flap 4 a short arm 10 to which is pivoted at 11 a long operating link or push rod 12. As clearly shown in Figure 1, the operating rod 12 extends to a point adjacent to the slot 3 and is pivoted at 13 to one arm of a bell crank 14 which is pivoted at 15 to the internal structure of the wing.

The upper opening of the slot 3 is adapted to be closed by a cover 16 which is hinged to the nose of the wing 1, as shown at 17. A second slot cover 18 for the lower opening of the slot is also hinged at the point 17. As clearly shown in the drawings, when the covers 16 and 18 are in their closed positions, they conform to the contour of the upper and lower surfaces of the wing 1, thereby affording an airfoil section.

A push rod 19 is pivoted to the other arm of the bell crank 14, as shown at 20. The free end of the rod 19 is pivoted to the undersurface of the cover 16, as shown at 21. A toggle link 22 is hinged to the lower cover 18, as shown at 22', and an elongated lever 23 is pivoted to the link 22. The lever 23 is pivoted to the cover 16, as shown at 24, and is formed with a short offset portion 25. A rod 26 is pivoted to the offset portion 25, as shown at 27, and the rod 26 is further formed with a lost motion slot 28 in which is adapted to move a pin 29 carried by the bell crank 14. The rod 26 is attached to one of the internal spars by tension spring 30.

It is thought apparent that since the pivot points 6, 11 and 15 are in line when the slot 3 and flap 4 are in their closed positions, it is not possible for the aerodynamic forces working on the leading edge of the wing to rock the bell crank 14 about its pivot 15 to cause the upper slot cover 16 to open. This is a very important feature of the present invention in that it will positively prevent the slot in the leading edge of the wing from being opened except when such opening is desired by the pilot of the airplane.

When the pilot operates his control to lower the flap it will be appreciated that the flap 4 may move through an angle of approximately 15° before the bell crank 14 begins to rock about its pivot 15 to open the cover 16. This is very desirable in that there are certain flight conditions where it is desired to have some flap movement without opening the slot. When the bell crank has rocked sufficiently to cause the push rod 19 to open the cover 16 slightly, the offset portion 25 and the lever 23 and link 22 will move the lower slot cover 18 into a well or recess 31 provided in the upper slot cover 16. This will give an airfoil section to the upper cover 16 and as the upper slot cover is moved further, the lower slot cover will remain in its nested position and thus afford optimum airflow through the slot 3.

In Figure 2, there is covered a still further form of my invention. In this modification, the operating link 12 is hinged at 50 to one arm of a bell crank 51 and the bell crank is pivoted at 52 to the internal structure of the wing 1. A second operating link 53 is pivoted to the other arm of the bell crank, as shown at 54. The opposite end of the link 53 is pivoted at 13 to the bell crank 14 which operates the upper slot cover 16.

It should be noted that when the slot 3 and the flap 4 are in the closed positions the pivot points 13, 54 and 52 are in a straight line, thereby affording a lock, and it is not possible for the aerodynamic forces acting on the nose of the wing 1 to open the upper slot cover 16. Clearly, the slot 3 can only be opened when the pilot manipulates his controls to lower the flap 4 to rock the bell crank 51 about the pivot 52.

In Figure 3 there is shown another form of slot and flap combination in which the mechanism holding the upper slot cover 16 in its closed position is adjacent to the slot 3. In this form, it can be seen that the operating link 12 is pivoted at 13 to a lever 60 which is pivoted at 61 to the internal structure of the wing 1 at a point adjacent to the nose. A push rod 62 is pivoted to the lever 60 as shown at 63, and to the upper slot cover as shown at 64. The rod 62 is curved as indicated at 65 so that it will not interfere with the pivot point 61 of the lever 60.

Pivoted to the lower slot cover 18 as shown at 66 is a short rod 67. Secured to the end of the rod 67 is a sleeve 68 in which is disposed a helical spring 69. Pivoted at 70 to the lever 60 is a rod 71 which extends into the sleeve 68. A pin 72 provided on the rod 71 projects through a lost motion slot 73 provided in the sleeve 68. It is thought obvious therefore that when the lever 60 is moved about its pivot 61 by the lowering of the flap 4, the rod 71 will slide in the sleeve 68, compressing the spring 69, thereby causing the lower slot cover 18 to move to the broken line position shown in Figure 1 whereby a smooth contour is provided in the slot 3.

It should be further observed that the pivot points 13, 61 and 63 are in a substantially straight line when the slot 3 and the flap 4 are in their closed positions. As a result, it is not possible for the upper slot cover 16 to be opened by virtue of the forces acting on the wing 1.

By placing the straight line pivot points 13, 61, 63 adjacent the slot cover 16, the relatively great aerodynamic forces tending to open the slot will be confined to this structure and not be transmitted to the other control mechanism and surfaces.

Figure 5:
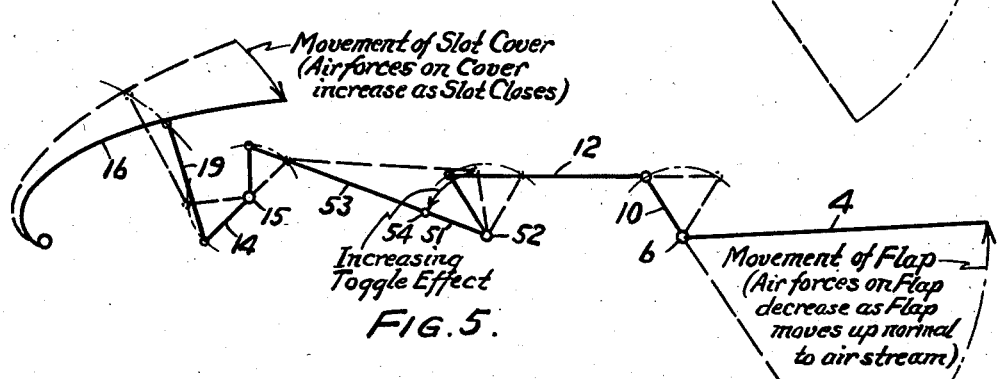
Figure 5 is a diagrammatic representation of the connecting linkage shown in Figure 2.
Figure 6:
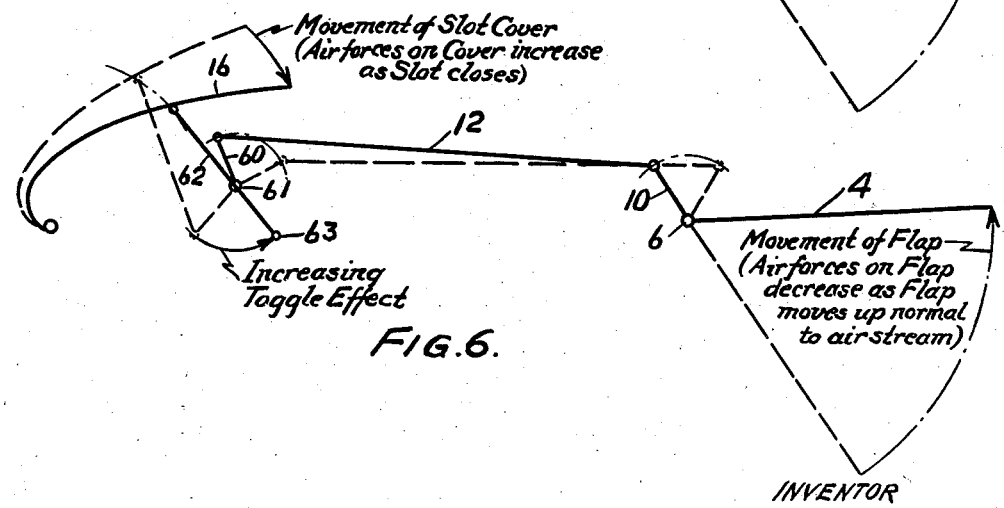
Figure 6 is a diagrammatic representation of the connecting linkage shown in Figure 3.

In Figures 4, 5 and 6, I have shown diagrammatically the linkage that interconnects the slot and flap which tend to normally balance each other aerodynamically.

It will be noted that when the flap approaches its position normal to the airstream, the air forces affecting the flap movement decrease toward zero. Simultaneously, the slot is closing and the air forces tending to open the slot cover increase. During this movement, the toggle effect of the linkage is also increasing which compensates for the increased air force on the slot cover.

From the foregoing description, it will be appreciated that I have provided a wing having an interconnected slot and flap in which the connecting linkage is so arranged that it exerts its greatest mechanical force when the greatest aerodynamic forces are acting on the slot or flap. More specifically, as the flap and slot move, the toggle effect of the linkage tends to balance the aerodynamic forces acting on them.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

This application is a division of application filed by me November 12, 1940, Serial No. 365,347, now Patent No. 2,321,837, granted June 15, 1943.

What I claim and desire to protect by Letters Patent is:

1. An airfoil comprising a main section and a slot cover supported adjacent the leading edge of the main section and adapted to be opened to form a slot, a rear flap supported from the main section and members forming interconnected operative connections between said cover and flap whereby they may be rendered cooperatively operative, said operative connections being so arranged that said members will assume relative positions such that independent of increase in the angle of attack of the airfoil in flight as the slot cover opens the force transmitted to the flap through the operative connections increases from about zero in the closed position of the cover to a maximum in its fully opened position to substantially balance the increased force exerted by the flap as it moves to operative positions.

2. An airfoil according to claim 1, characterized by the fact that the interconnected operative connections between the slot cover and the flap include a toggle so arranged that as the slot cover opens and the flap is rendered operative in flight the members forming the toggle will change angularity with relation to the force acting on the slot cover to increase the force transmitted to the flap to substantially balance the force exerted by the flap.

3. An airfoil according to claim 1, characterized by the fact that the interconnected operative connections between the slot and the flap are so arranged that on operation thereof in flight the flap will be rendered substantially effective before the slot cover opens sufficiently to render the slot consequentially effective.

4. An airfoil according to claim 1, characterized by the fact that the interconnected operative connections between the slot and the flap are so arranged as to be in at least a dead center position with respect to opening movement of the cover and to move out of dead center position to open the cover.

FRANK R. MAXWELL.